United States Patent [19]

Daimon et al.

[11] Patent Number: 4,857,377

[45] Date of Patent: Aug. 15, 1989

[54] ELECTROCONDUCTIVE FABRIC SHEET AND MOLDED ARTICLE HAVING IT ON SURFACE THEREOF

[75] Inventors: Takashi Daimon; Hideshi Sakamoto, both of Ichihara; Tatsuya Adachi, Kitakyushu, all of Japan

[73] Assignee: Chisso Corporation, Japan

[21] Appl. No.: 158,774

[22] Filed: Feb. 22, 1988

[30] Foreign Application Priority Data

| Feb. 27, 1987 | [JP] | Japan | 62-44315 |
| Feb. 27, 1987 | [JP] | Japan | 62-44316 |
| Mar. 2, 1987 | [JP] | Japan | 62-47409 |
| Mar. 2, 1987 | [JP] | Japan | 62-47410 |

[51] Int. Cl.$^4$ ............................................. B32B 33/00
[52] U.S. Cl. ...................................... 428/90; 428/95; 428/97; 428/922; 427/200; 427/205; 427/206
[58] Field of Search ............... 428/90, 95, 97, 922; 427/200, 205, 206

[56] References Cited

U.S. PATENT DOCUMENTS 3,973,059  8/1976  Brown et al. .................... 428/90

Primary Examiner—Marion C. McCamish
Attorney, Agent, or Firm—Leydig, Voit & Mayer

[57] ABSTRACT

There is here provided a flocked product having a warm and soft appearance and a thick and tender feel which is obtained by flocking the surface of a nonwoven, woven or knitted fabric. That is, the present invention intends to provide a flocked electroconductive fabric sheet which is obtained by forming an adhesive layer on either surface of one electroconductive fabric selected from the group consisting of electroconductive nonwoven, woven and knitted fabric each composed mainly of heat fusible fiber and electroconductive fiber, and planting and fixing, on the surface having the adhesive layer, flocks of short fiber containing 1% by weight or more of the electroconductive fiber; and a molded article having the above flocked electroconductive fabric sheet on the surface thereof which is obtained by putting the flocked electroconductive fabric sheet in a mold so that the flocks on the fabric sheet may contact with the inner wall of the mold, and injecting melted resin into the mold, or pressing the melted or softened resin against the fabric sheet in the mold.

Since electroconductivity is imparted to the fabric, any dust does not adhere to the flocks on the fabric sheet by static electricity, and therefore people can be protected from shock by discharge of the static electricity. In addition, the fabric sheet can be fixedly and securely bound with the molded article. In consequence, the flocked electroconductive fabric sheet and the molded article having the fabric sheet on the surface thereof can be suitably used as interior decorations in automobiles, furniture, carpets cloths, footwear and miscellaneous goods.

14 Claims, No Drawings

ELECTROCONDUCTIVE FABRIC SHEET AND MOLDED ARTICLE HAVING IT ON SURFACE THEREOF

BACKGROUND OF THE INVENTION

1. Field of the Invention

The present invention relates to a flocked product having electroconductivity and a molded article on which the flocked product is mounted and fixed.

More particularly, the present invention relates to a flocked product to which any dust does not adhere y static electricity, and a molded article on which the flocked product is mounted and fixed and which has the fluffy surface like velvet and corduroy without any adherent dust by static electricity and without any discharge shock of static electricity.

2. Description of the Prior Art

In recent years, the so-called flocked products have been widely utilized for clothes, footwear, carpets, furniture, miscellaneous goods and the like, and these flocked products can be prepared by first coating the surfaces of nonwoven, woven or knitted fabric bases with an adhesive, and then planting and fixing, on the surfaces, pieces of short fiber called piles or flocks by the utilization of static electricity.

Commercial values of the flocked products reside in a warm and soft appearance like fur as well as a thick and tender feel, with which users are pleased.

Further, as interior materials of automobiles and the like, flocked products having warm and soft fluffy surfaces have often been substituted for conventional vinyl chloride leathers and the like. In this case, the flocked products are stuck on molded plastic articles which are base materials.

However, with regard to the flocked products and molded articles on which the flocked products have been stuck, dust is very liable to adhere to the surfaces of the flocked products and the molded articles having them by static electricity, and their appearance tends to be impaired, which makes users undelighted. In addition, there is the problem that users often undergo unpleasant shock of electrical discharge of static electricity particularly in winter.

SUMMARY OF THE INVENTION

According to the present invention, there are provided an electroconductive fabric sheet which is obtained by forming an adhesive layer on either surface of an electroconductive nonwoven, woven and knitted fabric base composed mainly of hot-fusible fiber and electroconductive fiber, and planting and fixing, on the surface having the adhesive layer, flocks of short fiber containing 1% by weight or more of the electroconductive fiber; and a molded article having the above electroconductive fabric sheet on the surface thereof which is obtained by putting the electroconductive fabric sheet in a mold so that the flocks on the fabric sheet may contact with the inner wall of the mold, and injecting melted resin into the mold, or pressing the melted or softened resin against the fabric sheet in the mold.

DESCRIPTION OF THE PREFERRED EMBODIMENTS

The inventors of the present application have intensively conducted researches with the intention of solving the above-mentioned problems, and as a result, they have found that the generation of static electricity can be inhibited by adding electroconductive fiber to a nonwoven, woven or knitted fabric base, and further adding the electroconductive fiber to short fiber (hereinafter referred to as the flocks) which will be planted on the fabric base, so that dust can be prevented from adhering thereto. The present invention has been completed on the basis of this knowledge.

The present invention is directed to an electroconductive fabric sheet which is obtained by forming an adhesive layer on either surface of an electroconductive nonwoven, woven and knitted fabric composed mainly of heat fusible fiber and electroconductive fiber, and planting and fixing, on the surface having the adhesive layer, flocks of short fiber containing 1% by weight or more of the electroconductive fiber; and a molded article having the above electroconductive fabric sheet on the surface thereof which is obtained by putting the electroconductive fabric sheet in a mold so that the flocks on the fabric sheet may contact with the inner wall of the mold, and injecting melted resin into the mold, or pressing the melted or softened resin against the fabric sheet in the mold.

In the present invention, there is used, as a base material, a nonwoven fabric (hereinafter referred to as the electroconductive nonwoven fabric) composed mainly of a fiber mixture of heat fusible fiber and electroconductive fiber, or a woven or knitted fabric (hereinafter referred to as the electroconductive woven or knitted fabric) composed mainly of a fiber mixture of heat fusible fiber and electroconductive fiber.

Examples of the usable electroconductive fiber include copper-adsorbed fiber, metal-plated fiber, carbon fiber, carbon composite fiber, metal-deposited fiber and metallic fiber.

Examples of the usable heat fusible fiber include polyolefin fiber, polyamide fiber, polyester fiber, polyacrylonitrile fiber and composite fibers thereof, and they can be used alone or in a combination thereof.

In addition to the electroconductive fiber and the heat fusible fiber mentioned above, the fabric may contain fiber having high melting point or nonmelting fiber. This fiber plays a role of a reinforcing material and other roles at the time of manufacturing nonwoven fabric, at the time of the spinning, knitting or weaving of yarn for the woven or knitted fabric of the present invention, or in the molded articles of the present invention.

The electroconductive nonwoven fabric base can be obtained from the above-mentioned fiber mixture composed mainly of the electroconductive fiber and the heat fusible fiber in accordance with a binder method, a needle punching method, a method of utilizing water pressure and spun bonding, a thermal adhesion method or a wet manufacturing method. The unit weight of the electroconductive nonwoven fabric is not particularly limited, but it is preferably within a range of 20 to 200 g/m$^2$. In order to facilitate the coating of an adhesive, the nonwoven fabric may be slightly subjected to heat pressing treatment.

The amount of the electroconductive fiber used in the electroconductive nonwoven base is within a range of 1 to 90% by weight, preferably 5 to 60% by weight. When the amount of the electroconductive fiber is less than 1% by weight, satisfactory conductivity cannot be obtained, and when it is more than 90% by weight, it is very difficult to manufacture the nonwoven fabric.

The electroconductive woven or knitted fabric can be obtained by the following methods: A method of mixing cut fibers of the electroconductive fiber and the heat fusible fiber, spinning yarn from the mixture, and weaving the fabric by the use of the yarn as at least a part of weft and warp; a method of weaving the fabric from filament yarns of the electroconductive fiber and the heat fusible fiber; a method of weaving the fabric from twisted yarn of the electroconductive fiber and the heat fusible fiber; and a method of knitting such a spun yarn as mentioned above, filament yarn and alternately twisted yarn to prepare the knitted fabric or lace.

The thickness of the electroconductive woven or knitted fabric is not particularly limited, and any thickness is acceptable.

The content of the electroconductive fiber in the electroconductive woven or knitted fabric is within a range of 1 to 90% by weight, preferably 5 to 60% by weight. When the content of the electroconductive fiber is less than 1% by weight, satisfactory conductivity cannot be obtained, and when it is more than 90% by weight, it is difficult to prepare the woven or knitted fabric.

The adhesive for the adhesive layer used in the present invention is not particularly limited, but the preferable adhesive is the heat fusible resin which can be readily melted when heated and which can be dissolved or dispersed in water and/or a solvent in order to form a solution or a dispersion. Examples of the heat fusible resin having such characteristics include polyacrylate resin, polyamide resin, polyolefin resin, ethylene-vinyl acetate copolymer and other various hot-melt type resins.

These resins may be used alone or in the form of a mixture with known additives suitable for the hot-melt adhesive. Examples of the additives include an elastomeric gum rubber such as a natural or a synthetic rubber latex, an extender such as inorganic fillers, a thickener, a colorant, an agent for imparting thixotropy, and if necessary, an agent for imparting electroconductivity such as carbon black and metallic particles.

The flocks which will be planted on the electroconductive nonwoven fabric are short fiber pieces each having a length of about 0.3 to 30 mm and a thickness of about 1 to 20 denier which are prepared from the fiber mixture of the electroconductive fiber and the non-conductive fiber.

Examples of the electroconductive fiber used in the flocks include copper-adsorbed fiber, metal-plated fiber, carbon fiber, carbon composite fiber, metal-deposited fiber and metallic fiber, but the copper-adsorbed fiber is most preferable because it has good flexibility and is colorable.

Examples of the non-electroconductive fiber include various synthetic fibers such as polyolefin fiber, polyamide fiber, polyester fiber, polyacrylate fiber, polyacrylonitrile fiber, polyvinyl alcohol fiber, polyvinyl chloride fiber; semisynthetic fiber such as cellulose acetate; regenerated fiber such as rayon; natural fibers such as cotton, hemp and wool; and composite fibers thereof. They may be used alone or in the form of a mixed fiber thereof, but it is preferred to use the fiber prepared from material having a higher melting point than that of a resin which is the base material of a molded article.

The amount of the electroconductive fiber used for the flocks is required to be 1% by weight or more for the sake of the generation of conductivity. However, when the amount of the electroconductive fiber is in excess, flexibility of the flocked article deteriorates and costs of the article increase unpreferably.

The molded article may be prepared by injecting a resin into a mold containing the fabric or pressing the resin against the fabric therein, and examples of this resin include thermoplastic resins such as polypropylene, polyethylene, vinyl chloride resin, ethylene-vinyl acetate copolymer, polyacrylate resin, styrene resin, ABS, polyamide resin, polyester, polycarbonate, polyimide, polyacetal, ethylene-vinyl alcohol copolymer, cellulose resin and polyurethane; and thermosetting resins such as phenol resin, urea resin, melamine resin, guanamine resin, epoxy resin, diallyl phthalate resin and unsaturated polyester resin.

In the present invention, the heat fusible fiber used for the electroconductive nonwoven, woven or knitted fabric and the resin for the molded article are preferably the same or homologous, because in such a case, the heat fusible fiber and the resin for the article can be thermally integrated into each other smoothly during molding.

The electroconductive fabric of the present invention may be manufactured, for example, by the following procedure:

In the first place, the electroconductive nonwoven, woven or knitted fabric which have been prepared in the above-mentioned manner is coated on either surface thereof with a solution or an aqueous emulsion of a hot-melt type adhesive resin by means of knife coating, spray coating, roll coating or the like in order to form an adhesive resin layer, and flocks are then planted on the fabric by a known planting means such as an electrostatic system, a flocking machine by combined use of electrostatic method and vibration method or the like while the adhesive resin layer is still in the wet state. Afterward, drying is carried out to thereby fix the planted flocks on the fabric, and the obtained electroconductive nonwoven, woven or knitted fabric is then subjected to a brushing process. The means for forming the adhesive layer of the heat fusible resin is not limited, and the adhesive to be used may be the hotmelt type adhesive which exhibits adhesive properties at a temperature below softening points of the fibers for the nonwoven, woven or knitted fabric and the flocks thereon.

The electroconductive fabric of the present invention may be manufactured by directly forming the adhesive layer on the electroconductive nonwoven, woven or knitted fabric, planting the flocks thereon, drying the adhesive layer to hold and fix the flocks thereon. Therefore, in the thus manufactured fabric of the present invention, flexibility can be retained, and electroconductivity and thus the ability to discharge static electricity can be acquired.

The molded article having the electroconductive fabric on the surface thereof which is concerned with the present invention can be manufactured, for example, by the following procedure:

The electroconductive nonwoven, woven or knitted fabric is put in a mold so that the flocks on the fabric sheet may contact with the inner wall of the mold, and a base resin is then injected into the mold. Alternatively, the melted or softened base resin is pressed against the electroconductive nonwoven, woven or knitted fabric in the mold by transfer molding, compression molding (drawing or stamping), vacuum molding or pressure forming so as to obtain the molded article on which the fabric is held and fixed.

As described above, the electroconductive fabric of the present invention is manufactured by first mixing the nonwoven, woven or knitted fabric material with the electroconductive fiber to impart conductivity to the fabric and directly planting thereon the flocks containing the electroconductive fiber with the interposition of the adhesive layer. Therefore, the obtained fabrics can retain the conductivity throughout. Further, as described above, the heat fusible fiber is used as the main fiber component of the nonwoven, woven or knitted fabric and the base resin of the molded article is molded in the mold containing the nonwoven, woven or knitted fabric sheet by the injection or another means. Therefore, the heat fusible fiber of the nonwoven, woven or knitted fabric is melted into the base resin of the molded article by heat of the latter, so that strong linkage is achieved therebetween and electroconductivity is additionally maintained on the surface thereof.

The fabric of the present invention can prevent dust from adhering thereto, probably because electrical charges of static electricity generated on the flocks surfaces are immediately eliminated through the whole fabric. Further, owing to no accumulation of the electrical charges of the static electricity, people can be protected from shock which results from discharge of the static electricity.

The electroconductive fabric of the present invention exhibits a beautiful appearance, has a tender feel like fur, prevents the adhesion of dust which is a conventional problem, and possesses flexibility. Therefore, excellent effects are produced, when the fabric is used for interior decoration, furniture, carpets, footwear and miscellaneous goods in addition to clothes.

Moreover, the molded article having the electroconductive fabric on the surface thereof gives an elegant appearance of the raised pile tufts, has a tender feel like fur in cooperation with a soft feel of the lined nonwoven, woven or knitted fabric, prevents the adhesion of dust by the static electricity which is one of the conventional problems, and protects people from the shock which results from the discharge of the static electricity. Further, the heat fusible fiber of the nonwoven, woven and knitted fabric is strongly and securely bound with the base resin of the molded article, and therefore the molded article of the present invention is very useful as a material for interior decoration of automobiles and the like.

EXAMPLES

Now, the present invention will be described in detail in reference to examples and comparative examples, but it should not be limited to these examples.

EXAMPLE 1

An electroconductive nonwoven fabric having a unit weight of 100 g/m$^2$ was prepared from a fiber mixture of 10% by weight of copper-adsorbed polyacrylonitrile fiber having a thickness of 3 denier and a length of 5 cm and 90% by weight of polypropylene fiber having a thickness of 3 denier and a length of 5 cm, and the thus prepared fabric was then coated with an aqueous emulsion comprising heat fusible polyacrylate resin and a thickener and having a solid content of 45% by weight, in a ratio of 100 g/m$^2$ in terms of wet weight. On the other hand, flocks were prepared from a fiber mixture of 80% by weight of rayon short fiber having a thickness of 2 denier and a length of 0.5 mm and 20% by weight of copper-adsorbed polyacrylonitrile fiber having a thickness of 1.5 denier and a length of 0.5 mm, and these flocks were then planted on the above nonwoven fabric by means of a flocking machine by combined use of electrostatic method and vibration method. After drying at a temperature of about 80° C., brushing was carried out to obtain a flocked electroconductive fabric sheet. The raised flocks on the fabric sheet had a surface resistance of $10^6$ Ω□, which meant that it was excellent in electroconductivity, and the planted flocks mainly comprising the rayon fiber exhibited a beautiful appearance. The adhesion of dust onto the surface of the fabric sheet was not observed at all.

EXAMPLE 2

An electroconductive nonwoven fabric having a unit weight of 50 g/m$^2$ was prepared from a fiber mixture of 5% by weight of nickel-plated fiber which was a kind of electroconductive fiber, 65% by weight of nylon fiber and 30% by weight of polyacrylonitrile fiber, and the thus prepared fabric was then coated with the same aqueous emulsion of the polyacrylate resin as in Example 1. On the other hand, flocks were prepared from a fiber mixture of 95% by weight of nylon fiber having a thickness of 3 denier and a length of 2 mm and 5% by weight of copper-adsorbed polyacrylonitrile fiber having a thickness of 1.5 denier and a length of 2 mm, and these flocks were then planted on the above fabric by means of a flocking machine by combined use of electrostatic method and vibration method. The emulsion was dried at a temperature of about 80° C. to fix the flocks on the fabric, and brushing was carried out, thereby obtaining a flocked electroconductive fabric sheet. The standing flocks on the fabric sheet had a surface resistance of $10^8$ Ω□. The adhesion of dust onto the surface of the fabric sheet was not observed.

EXAMPLE 3

A thin knitted fabric was prepared by knitting a spun yarn made from a fiber mixture comprising 10% by weight of cut copper-adsorbed polyacrylonitrile fiber and 90% by weight of cut polypropylene fiber. This knitted fabric was coated on either surface thereof with an aqueous emulsion comprising heat fusible polyacrylate resin and a thickener and having a solid content of 45% by weight, in a ratio of 100 g/m$^2$ in terms of wet weight. On the other hand, flocks were prepared from a fiber mixture of 80% by weight of rayon short fiber (2 denier, length 0.5 mm) and 20% by weight of copper-adsorbed polyacrylonitrile fiber (thickness 1.5 denier, length 0.5 mm), and these flocks were then planted on the above knitted fabric by means of a flocking machine by combined use of electrostatic method and vibration method. After drying at a temperature of about 80° C., brushing was carried out to obtain a flocked electroconductive fabric sheet.

The raised flocks on the fabric sheet had a surface resistance of $10^6$ Ω□, which meant that it was excellent in electroconductivity, and the planted flocks mainly comprising the rayon fiber exhibited a beautiful appearance.

EXAMPLE 4

Nylon filament yarn was used as the warp, and two kinds of nylon filament yarn and copper-adsorbed fiber filament yarn were used in a ratio of 3:1 (by weight) as the weft in order to weave a thin woven fabric. Then, the woven fabric was coated on either surface thereof with a polyacrylate adhesive. On the other hand, flocks were prepared from a fiber mixture of 95% of polyacrylonitrile fiber (1.5 denier, length 2 mm) and 5% by weight of copper-adsorbed polyacrylonitrile fiber (1.5 denier, length 2 mm), and these flocks were then planted on the above woven fabric by means of a flocking machine by combined use of electrostatic method and vibration method. After drying at a temperature of about 80° C., brushing was carried out to obtain a flocked electroconductive fabric sheet.

The raised flocks on the fabric sheet had a surface resistance of $10^8$ $\Omega\square$.

EXAMPLE 5

An electroconductive nonwoven fabric having a unit weight of 100 g/m$^2$ was prepared from a fiber mixture of 10% by weight of copper-adsorbed polyacrylonitrile fiber having a thickness of 3 denier and a length of 5 cm and 90% by weight of polypropylene fiber having a thickness of 3 denier and a length of 5 cm, and the thus prepared nonwoven fabric base was then coated with an aqueous emulsion comprising heat fusible polyacrylate resin and a thickener and having a solid content of 45% by weight in a ratio of 100 g/m$^2$ in terms of wet weight. On the other hand, flocks were prepared from a fiber mixture of 80% by weight of polyester fiber (2 denier, length 0.5 mm) and 20% by weight of copper-adsorbed polyacrylonitrile fiber (1.5 denier, length 0.5 mm), and these flocks were planted on the above nonwoven fabric by means of a flocking machine by combined use of electrostatic method and vibration method. After drying it at a temperature of about 80° C., brushing was carried out to obtain a flocked electroconductive fabric sheet.

The flocked fabric sheet was put and fixed in a mold (upper portion) of a compression molding machine, with the raised flock surface of the fabric sheet upward positioned, and polypropylene resin which had been melted at 200° C. was extruded into the mold (lower portion). Compression molding was then performed under conditions that mold clamping pressure was 10 kg/cm$^2$G, mold temperature was 30° C. and cooling time was 40 seconds, in order to prepare a moled article.

During the above compression molding, the propylene fiber in the electroconductive nonwoven fabric sheet was melted by heat from the polypropylene resin which was the base material of the molded article, so that the fiber and the resin were integrated with each other. On the surface of the molded article, the planted flocks mainly comprising the polyester fiber exhibited a beautiful appearance.

The raised flocks on the molded article had a surface resistance of $10^6$ $\Omega\square$, which meant that it was excellent in electroconductivity, and the adhesion of dust by static electricity was not observed. Further, when measured by a rotary static tester (made by Shishido Electrostatic, Ltd.), triboelectrification voltage was as low as 100 volts or less.

EXAMPLE 6

An electroconductive nonwoven fabric having a unit weight of 120 g/m$^2$ was prepared from a fiber mixture of 5% by weight of nickel-plated polyacrylonitrile fiber having a thickness of 3 denier and a length of 5 cm and 95% by weight of heat fusible type composite fiber comprising crystalline polypropylene and polyethylene and having a thickness of 3 denier and a length of 5 cm, and the thus prepared nonwoven fabric was then coated with a polyacrylate adhesive. On the other hand, flocks were prepared from a fiber mixture of 93% by weight of nylon fiber (1.5 denier, length 2 mm) and 7% by weight of copper-adsorbed polyacrylonitrile fiber (1.5 denier, length 2 mm), and these flocks were then planted on the above nonwoven fabric base by means of a flocking machine by combined use of electrostatic method and vibration method. After drying at a temperature of about 80° C., brushing was carried out to obtain a flocked electroconductive fabric sheet. Then, the thus obtained flocked fabric sheet was put in a mold of an injection molding machine so that the flocks on the fabric sheet might contact with the inner wall of the mold, and propylene-ethylene block copolymer containing 8.5% by weight of ethylene and having a melt flow rate of 18 g/10 minutes was injected into the mold under conditions of a resin temperature of 200° C., an injection pressure (primary pressure) of 140 kg/cm$^2$G, an injection speed of 30 mm/second, an injection time of 20 seconds, a mold cooling temperature 50° C. and a cooling time 25 seconds.

As a result, a molded article having a size of 200 mm × 200 mm and a depth of 50 mm was obtained.

The outer surface of the molded article was covered with the beautiful flocks mainly comprising the nylon fiber and exhibited a tender feel. The raised flocks on the fabric sheet had a surface resistance of $10^8$ $\Omega\square$, which meant that it was excellent in electroconductivity, and the adhesion of dust onto the flocks by static electricity was not observed.

EXAMPLE 7

A nonwoven fabric as used in Example 5 was coated on either surface thereof with a polyacrylate adhesive. On the other hand, flocks were prepared from a fiber mixture of 70% by weight of polyester fiber (2 denier, length 3 mm) and 30% by weight of copper-adsorbed nylon fiber (2 denier, length 3 mm), and these flocks were then planted on the above nonwoven fabric by means of a flocking machine by combined use of electrostatic method and vibration method. After drying it at a temperature of about 80° C., brushing was carried out to obtain a flocked electroconductive fabric sheet. Afterward, the thus prepared flocked fabric sheet was put in a mold of a pressure forming machine so that the flocks on the fabric sheet might contact with the inner wall of the mold, and a polypropylene sheet which had been preheated at 170° C. and softened thereby was put on the fabric sheet in the mold, followed by pressure forming at a pressure of 3 kg/cm$^2$G. The outer surface of the resulting rectangular container was covered with the beautiful planted flocks mainly comprising the polyester fiber and exhibited a tender feel. The raised flocks on the fabric sheet had a surface resistance of $10^5$ $\Omega\square$ and therefore was excellent in electroconductivity.

EXAMPLE 8

A thin knitted fabric was prepared by knitting a spun yarn made of a fiber mixture comprising 10% by weight of cut copper-adsorbed polyacrylonitrile fiber and 90% by weight of cut polypropylene fiber. This knitted fabric was then coated on either surface thereof with an aqueous emulsion comprising heat fusible polyacrylate resin and a thickener and having a solid content of 45% by weight, in a ratio of 80 g/m$^2$ in terms of wet weight. On the other hand, flocks were prepared from a fiber mixture of 80% by weight of polyester fiber (2 denier, length 0.5 mm) and 20% by weight of copper-adsorbed polyacrylonitrile fiber (1.5 denier, length 0.5 mm), and these flocks were then planted on the above knitted fabric base by means of a flocking machine by combined use of electrostatic method and vibration method. After drying it at a temperature of about 80° C., brushing was carried out to obtain a flocked electroconductive fabric sheet.

The flocked fabric sheet was put and fixed in a mold (upper portion) of a compression molding machine so that the raised flocks on the fabric sheet might contact with the inner wall of the mold, and polypropylene resin which had been melted at 200° C. was extruded into the mold (lower portion). Compression molding was then performed under conditions that mold clamping pressure was 10 kg/cm$^2$G, mold temperature was 30° C. and cooling time was 40 seconds, in order to obtain a molded article.

During the above compression molding, the polypropylene fiber in the electroconductive nonwoven fabric sheet was melted by heat from the polypropylene resin of the molded article, so that the fiber and the resin were integrated with each other. On the surface of the molded article, the planted flocks mainly comprising the polyester fiber exhibited a beautiful appearance. Surface resistance of the molded article was $10^6$ Ω□, which value was indicative of being excellent in electroconductivity, and the adhesion of dust onto the fabric sheet was not observed.

Further, when measured by a rotary static tester (made by Shishido Electrostatic, Ltd.), triboelectrification voltage was as low as 100 volts or less.

EXAMPLE 9

For both warp and weft, two kinds of heat fusible type composite fiber filament yarn comprising crystalline polypropylene and polyethylene and copper-adsorbed polyacrylonitrile fiber filament yarn were used in a ratio of 9:1 (by weight) in order to prepare a thick woven fabric base.

Then, the thus prepared woven fabric was coated on either surface thereof with a polyacrylate adhesive. On the other hand, flocks were prepared from a fiber mixture of 93% by weight of nylon fiber (1.5 denier, length 2 mm) and 7% by weight of copper-adsorbed polyacrylonitrile fiber (1.5 denier, length 2 mm), and these flocks were then planted on the above woven fabric by means of a flocking machine by combined use of electrostatic method and vibration method. After drying it at temperature of about 80° C., brushing was carried out to obtain a flocked electroconductive fabric sheet.

Then, the thus obtained fabric sheet was put in a mold of an injection molding machine so that the flocks on the fabric sheet might contact with the inner wall of the mold, and propylene-ethylene block copolymer containing 8.5% by weight of ethylene and having a melt flow rate of 18 g/10 minutes was injected into the mold under conditions of a resin temperature of 200° C., an injection pressure (primary pressure) of 140 kg/cm$^2$G, an injection speed of 30 mm/second, an injection time of 20 seconds, a mold cooling temperature 50° C. and a cooling time 25 seconds.

As a result, a molded article having a size of 200 mm×200 mm and a depth of 50 mm was obtained. The outer surface of the molded article was covered with the beautiful planted flocks mainly comprising the nylon fiber and exhibited a tender feel. The raised flocks on the fabric sheet had a surface resistance of $10^8$ Ω□, which was indicative that it was excellent in electroconductivity, and the adhesion of dust onto the flocks was not observed.

EXAMPLE 10

A knitted fabric as used in Example 8 was coated on either surface thereof with a polyacrylate adhesive. On the other hand, flocks were prepared from a fiber mixture of 70% by weight of polyester fiber (2 denier, length 3 mm) and 30% by weight of copper-adsorbed nylon fiber (2 denier, length 3 mm), and these flocks were then planted on the above knitted fabric by means of a flocking machine by combined use of electrostatic method and vibration method. After drying it at temperature of about 80° C., brushing was carried out to obtain a flocked electroconductive fabric sheet. Afterward, the thus obtained fabric sheet was put in a mold of a pressure forming machine so that the flocks on the fabric sheet might contact with the inner wall of the mold, and a polypropylene sheet which had been preheated at 170° C. and softened was put on the woven fabric sheet in the mold, followed by pressure forming at a pressure of 3 kg/cm$^2$G.

The outer surface of the resulting rectangular container was covered with the beautiful planted flocks mainly comprising the polyester fiber and exhibited a tender feel. The raised flocks on the fabric sheet had a surface resistance of $10^5$ Ω□, which value was indicative that it was excellent in electroconductivity.

COMPARATIVE EXAMPLE 1

An electroconductive nonwoven fabric as used in Example 2 was coated with the same aqueous emulsion of the polyacrylate resin as in Example 2. On the other hand, flocks were prepared from a fiber mixture of 99.5% by weight of nylon fiber having a thickness of 3 denier and a length of 2 mm and 0.5% by weight of copper-adsorbed polyacrylonitrile fiber having a thickness of 3 denier and a length of 2 mm, and the thus prepared flocks were then planted on the above nonwoven fabric by means of a flocking machine by combined use of electrostatic method and vibration method. After drying it at a temperature of about 80° C. to fix the flocks thereon, brushing was carried out to prepare a flocked electroconductive fabric sheet. The raised flocks on the fabric sheet had a surface resistance of $10^{12}$ Ω□ or more and therefore was considered to have no electroconductivity, probably because the content of the conductive fiber in the flocks was as small as less than 1% by weight. Therefore, it was observed that some dust adhered to the flocks.

COMPARATIVE EXAMPLE 2

A woven fabric as used in Example 4 was coated with the same polyacrylate adhesive as in Example 4. On the other hand, flocks were prepared from a fiber mixture of 99.5% by weight of acrylic fiber (1.5 denier, length 2 mm) and 0.5% by weight of copper-adsorbed polyacrylonitrile fiber (1.5 denier, length 2 mm), and the thus prepared flocks were then planted on the above woven fabric by means of a flocking machine by combined use of electrostatic method and vibration method. After drying it at a temperature of about 80° C., brushing was carried out to prepare a flocked electroconductive fabric sheet.

The raised flocks on the fabric sheet had a surface resistance of $10^{12}$ Ω□ or more and therefore was considered to have no electroconductivity. Therefore, it was observed that some dust adhered to the flocks.

COMPARATIVE EXAMPLE 3

The same procedure as in Example 5 was repeated with the exception that the fiber mixture was replaced with another fiber mixture of 99.5% by weight of polyester fiber (2 denier, length 0.5 mm) and 0.5% by weight of copper-adsorbed polyacrylonitrile fiber (1.5 denier, length 0.5 mm), in order to obtain a molded article.

Although the thus obtained article had a beautiful appearance, surface resistance of the raised flocks thereon was $10^{12}$ Ω☐ or more, which was considered to have no electroconductivity. Hence, it was observed that some dust adhered to the flocks. Further, when measured in the same manner as in Example 5, triboelectrification voltage was as high as 7,000 volts.

COMPARATIVE EXAMPLE 4

The same procedure as in Example 8 was repeated with the exception that the fiber mixture was replaced with another fiber mixture of 99.5% by weight of polyester fiber (2 denier, length 0.5 mm) and 0.5% by weight of copper-adsorbed polyacrylonitrile fiber (1.5 denier, length 0.5 mm), in order to obtain a molded article.

Although the thus obtained article had a beautiful appearance, surface resistance of the raised flocks was $10^{12}$ Ω☐ or more, which was considered to have no electroconductivity. Hence, it was observed that some dust adhered to the flocks. Further, when measured in the same manner as in Example 8, triboelectrification voltage was as high as 7,000 volts.

WHAT IS CLAIMED IS:

1. A flocked electroconductive fabric sheet which is obtained by forming an adhesive layer on either surface of an electroconductive fabric selected from the group consisting of electroconductive nonwoven, woven and knitted fabric each composed mainly of heat fusible fiber and electroconductive fiber, and planting and fixing, on said surface having said adhesive layer, flocks of short fiber containing 1% by weight or more of electroconductive fiber.

2. A flocked electroconductive fabric sheet according to claim 1 wherein said electroconductive fabric contains 1 to 90% by weight of said electroconductive fiber.

3. A flocked electroconductive fabric sheet according to claim 1 wherein said electroconductive fiber contained in said electroconductive fabric and said electroconductive fiber contained in said flocks to be planted thereon are composed of at least one electroconductive fiber selected from the group consisting of copper-adsorbed fiber, metal-plated fiber, carbon fiber, carbon composite fiber, metal-deposited fiber and metallic fiber.

4. A flocked electroconductive fabric sheet according to claim 1 wherein said electroconductive fiber contained in said electroconductive fabric and said electroconductive fiber contained in said flocks to be planted thereon are composed of copper-adsorbed fiber.

5. A flocked electroconductive fabric sheet according to claim 1 wherein said heat fusible fiber contained in said electroconductive fabric base is composed of at least one fiber selected from the group consisting of polyolefin fiber, polyamide fiber, polyester fiber, polyacrylonitrile fiber and composite fibers thereof.

6. A flocked electroconductive fabric sheet according to claim 1 wherein non-electroconductive fiber contained in said flocks to be planted on said electroconductive fabric is composed of at least one fiber selected from the group consisting of polyolefin fiber, polyamide fiber, polyester fiber, polyacrylate fiber, polyacrylonitrile fiber, polyvinyl alcohol fiber, polyvinyl chloride fiber, semisynthetic fiber of cellulose acetate, regenerated fiber of rayon, cotton fiber, hemp fiber and wool fiber.

7. A flocked electroconductive fabric sheet according to claim 1 wherein an adhesive for use in said adhesive layer is composed of at least one heat fusible resin selected from the group consisting of polyacrylonitrile resin, polyamide resin, polyolefin resin and ethylene-vinyl acetate copolymer.

8. A molded article having a flocked electroconductive fabric sheet on the surface thereof which is obtained by forming an adhesive layer on either surface of one electroconductive fabric base selected from the group consisting of electroconductive nonwoven, woven and knitted fabric each composed mainly of heat fusible fiber and electroconductive fiber; planting and fixing, on said surface having said adhesive layer, flocks of short fiber containing 1% by weight or more of said electroconductive fiber in order to prepare a flocked electroconductive fabric sheet; putting said flocked electroconductive fabric sheet in a mold so that said flocks on said fabric sheet may contact with the inner wall of said mold; and injecting melted resin into said mold, or pressing said melted or softened resin against said fabric sheet in said mold.

9. A molded article having a flocked electroconductive fabric sheet on the surface thereof according to claim 8 wherein said electroconductive fabric contains 1 to 90% by weight of said electroconductive fiber.

10. A molded article having a flocked electroconductive fabric sheet on the surface thereof according to claim 8 wherein said electroconductive fiber contained in said electroconductive fabric and said electroconductive fiber contained in said flocks to be planted thereon are composed of at least one electroconductive fiber selected from the group consisting of copper-adsorbed fiber, metal-plated fiber, carbon fiber, carbon composite fiber, metal-deposited fiber and metallic fiber.

11. A molded article having a flocked electroconductive fabric sheet on the surface thereof according to claim 8 wherein said electroconductive fiber contained in said electroconductive fabric and said electroconductive fiber contained in said flocks to be planted thereon are composed of copper-adsorbed fiber.

12. A molded article having a flocked electroconductive fabric sheet on the surface thereof according to claim 8 wherein said heat fusible fiber contained in said electroconductive fabric is composed of at least one fiber selected from the group consisting of polyolefin fiber, polyamide fiber, polyester fiber, polyacrylonitrile fiber and composite fibers thereof.

13. A molded article having a flocked electroconductive fabric sheet on the surface thereof according to claim 8 wherein non-electroconductive fiber contained in said flocks to be planted on said electroconductive fabric is composed of at least one fiber selected from the group consisting of polyolefin fiber, polyamide fiber, polyester fiber, polyacrylate fiber, polyacrylonitrile fiber, polyvinyl alcohol fiber, polyvinyl chloride fiber, semisynthetic fiber of cellulose acetate, regenerated fiber of rayon, cotton fiber, hemp fiber and wool fiber.

14. A molded article having a flocked electroconductive fabric sheet on the surface thereof according to claim 8 wherein an adhesive for use in said adhesive layer is composed of at least one heat fusible resin selected from the group consisting of polyacrylate resin, polyamide resin, polyolefin resin and ethylene-vinyl acetate copolymer.

* * * * *